United States Patent [19]

Green

[11] Patent Number: 4,687,755
[45] Date of Patent: Aug. 18, 1987

[54] METAL PERFLUOROSULPHONIC ACID POLYMER CATALYST

[75] Inventor: Michael J. Green, Yateley, Nr. Camberley, England

[73] Assignee: BP Chemicals Limited, London, England

[21] Appl. No.: 879,141

[22] Filed: Jun. 26, 1986

[30] Foreign Application Priority Data

Jul. 6, 1985 [GB] United Kingdom ................. 8517188

[51] Int. Cl.⁴ ............................................ B01J 31/06
[52] U.S. Cl. .................................... 502/159; 502/168; 568/678
[58] Field of Search ................................ 502/159, 168

[56] References Cited

U.S. PATENT DOCUMENTS 4,038,213 7/1977 McClure et al. ................... 502/159
4,222,952 9/1980 Vick ................................ 502/159 X
4,304,724 12/1981 Nutt ................................ 502/159 X

FOREIGN PATENT DOCUMENTS 2469201 5/1981 France ............................ 502/159
18643 1/1982 Japan ............................. 502/159
167737 10/1982 Japan ............................. 502/159

Primary Examiner—Patrick P. Garvin
Attorney, Agent, or Firm—Brooks Haidt Haffner & Delahunty

[57] ABSTRACT

A perfluorosulphonic acid polymer suitable for use as a catalyst contains units of the formula:

$$\text{-[(SO}_3\text{)}_w\text{M(SO}_3\text{R)}_{z-w}\text{]} \quad \text{(I)}$$

wherein
M is a multivalent metal cation,
R is a $C_1$ to $C_8$ fluorinated alkyl group,
z is the valency of M, and
w is an integer having a value between 1 and $z-1$.

Also use of a polymer of formula (I) wherein M is aluminium as a catalyst in the production of glycol ethers by the reaction of an alkylene oxide and an alcohol.

10 Claims, No Drawings

METAL PERFLUOROSULPHONIC ACID POLYMER CATALYST

The present invention relates to metal perfluorosulphonic acid polymer catalysts and the preparation and use thereof. More specifically, this invention relates to a catalyst comprising a perfluorosulphonic acid polymer containing units derived from a metal perfluorosulphonic acid salt and the use of this catalyst in a process for preparing glycol ethers.

Polymers containing perfluorosulphonic acid groups have long been known to have catalytic properties. Examples of such properties include the alkylation of aromatic hydrocarbons, the nitration of aromatics with nitric acid, and the oxidative carbonylation of aromatics.

U.S. Pat. No. 4,356,318 discloses the use of Group VIII metal cations of perfluorosulphonic acid polymers as catalysts for the oxidative carbonylation of toluene to toluic acid. U.S. Pat. No. 4,446,329 discloses a process for the alkylation of aromatic substrates employing as a catalyst a metal cation salt of a perfluorosulphonic acid polymer. However, neither of these patents disclose perfluorosulphonic acid polymers containing metal cations which are surrounded by fluorosulphonic acid groups.

The present invention provides a metal perfluorosulphonic acid polymer catalyst having an increased number of fluorosulphonic acid groups surrounding the metal cation, thereby maximising the catalytic effect of the acid catalyst.

Accordingly, the present invention provides a perfluorosulphonic acid polymer suitable for use as a catalyst containing units of the formula:

$$[(SO_3)_w M(SO_3R)_{z-w}] \quad (I)$$

wherein
M is a multivalent metal cation,
R is a $C_1$ to $C_8$ fluorinated alkyl group,
z is the valency of M, and
w is an integer having a value between 1 and $z-1$.

The polymer may be represented by the general formula:

$$X[(SO_3)_w M(SO_3R)_{z-w}]_y \quad (II)$$

wherein
X is a perfluorosulphonic acid polymer backbone comprising fluorinated carbon atoms,
M, R, z and w are the same as in formula (I), and
y is an integer.

According to another embodiment of the present invention, a process is provided for the preparation of glycol ethers comprising reacting an alkylene oxide and an alcohol in the presence of a catalyst, characterised in that the catalyst is a perfluorosulphonic acid polymer containing units of the formula (I) as hereinbefore described.

The catalyst of the present invention is a perfluorosulphonic acid polymer containing units of the formula (I). Metals having such multiple valencies and useful herein include but are not limited to Al, Zn, Se, Cu, Sn, Cr, Co, Hg, Mg, Mh, Ni and B.

Preferred metal cations include $Al^{3+}$ and $Zn^{2+}$

The metal or metal cation is selected for the particular reaction in which the inventive catalyst will be employed. For example, $Al^{3+}$, $Fe^{3+}$, and $Cr^{3+}$ are generally preferred for use in alkylation reactions. Moreover, $Al^{3+}$ is also preferred as the catalyst used in preparing glycol ethers from the reaction of alkylene oxides and alcohols.

The group, designated as R in formula (I), is a $C_1$ to $C_8$ fluorinated alkyl group. Preferably, the fluorinated alkyl group will have from one to four carbon atoms with $CF_3$ being most preferred.

Generally, the perfluorosulphonic acid polymers which are used as the backbone and as one of the anion components of the metal perfluorosulphonic acid catalyst will have a number average molecular weight of at least 2,000. The polymer should contain a sufficient number of sulphonic acid groups to give an equivalent weight of between 500 to 20,000 and preferably from 900 to about 2,000. Although the polymer backbone comprises, for the most part, bonded fluorinated carbon atoms, it is not necessary that all other atoms be excluded. For example, oxygen atoms may be present either in the backbone or in the side chains of the polymer. Other atoms and/or groups such as hydrogen, chlorine, and carboxyl may be present in limited amounts without significantly reducing the effectiveness, the stability or the operability of the polymer. Perfluorosulphonic acid polymers may be employed in either powder or film form, preferably powder form.

The perfluorosulphonic acid polymer of the present invention may be prepared by known ion-exchange techniques. For example, a metal fluorosulphonic acid salt may be physically contacted with the fluorosulphonic acid polymer. Typically, the polymer will be physically mixed with an aqueous or alcoholic solution of the metal fluorosulphonic acid salt. The ion-exchange reaction typically occurs at room temperature and atmospheric pressure although the ion-exchange conditions may vary.

When preparing the metal perfluorosulphonic acid polymer of the present invention, it is desirable to allow sufficient time for the ion-exchange to occur such that at least 10% of the available sulphonic acid groups on the polymer that will be substituted with the metal fluorosulphonic acid salt. The necessary time will depend on the process conditions employed and the particular metal fluorosulphonic acid salt employed and can be easily determined by one skilled in the art.

The ion-exchanged polymer may be separated from the ion-exchange medium by means known in the art, for example by filtration or centrifugation. Following separation, it is preferred to wash the ion-exchanged polymer, suitably with water or a lower alkanol, for example methanol, and thereafter dry the polymer.

The perfluorosulphonic acid polymer of this invention can be used as catalyst in a wide variety of reactions. Typically, these catalysts can be employed in Friedel-Crafts and related reactions. More particularly, these catalysts can be employed in the production of glycol ethers from alkylene oxides and alcohols.

Whereas the majority of the units contained in the perfluorosulphonic acid polymer will have the formula $[(SO_3)M(SO_3R)_{z-1}]$, it is possible that there may be units present of the formula $[(SO_3)_2 M(SO_3R)_{z-2}]$ formed by exchange of two sulphonic acid groups on the perfluorosulphonic acid polymer backbone with a single molecule of the metal fluorosulphonic acid salt. Whilst it is not intended to be bound in any way be theory, it is believed that an exchange of the following type occurs in the case of M=Al for example:-

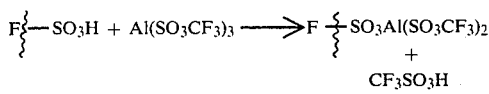

According to a separate embodiment of the present invention, glycol ethers are prepared by reacting an alkylene oxide and an alcohol in the presence as catalyst of the perfluorosulphonic acid polymer containing units of formula (I). It is preferred that the catalyst be an aluminium fluorosulphonic acid salt of the perfluorosulphonic acid polymer.

The alkylene oxide used as a reactant can be any alkylene oxide but is conveniently a lower alkylene oxide having less than 20 carbon atoms. Both unsubstituted alkylene oxides, for example ethylene oxide, and substituted alkylene oxides, for example epichlorohydrin may be used. Preferred alkylene oxides are ethylene oxide, propylene oxide, butylene oxide, cyclohexene oxide and epichlorohydrin.

In addition to an alkylene oxide, an alcohol is used as a coreactant. The alcohol reactant can be monohydric containing one hydroxyl group or can be polyhydric containing two or more hydroxyl groups. The alcohol reactant is typically a substituted or unsubstituted $C_1$ to $C_{10}$ monohydric or polyhydric alcohol. Examples of suitable alcohols include but are not limited to methanol, butanol, cyclopentanol, ethylene glycol, propylene glycol and glycerol. Preferred are $C_1$ to $C_6$ monohydric alcohols and dihydric alcohols (containing two hydroxyl groups). Combinations of these alcohols can also be employed.

The molar ratio or reactants can vary. In general, the molar ratio of alcohol to alkylene oxide should be in the range from 10:1 to 1:10, preferably 10:1 to 1:3. The catalyst is conveniently added in amount such that it constitutes between 1 and 10,000 ppm by weight of the reactants.

It is possible to carry out the above process at room temperature although higher temperatures can be used to accelerate the rate of reaction. The reaction is preferably carried out at a temperature in the range from 20° C. to 140° C.

The reaction can be carried out at atmospheric pressure or at a superatmospheric pressure in the range 1 to 20 bar. Preferably the reaction is carried out under the autogenous pressure generated by the reaction mixture in a closed vessel at the temperature of reaction.

The reaction can be carried out batchwise or continuously.

In another embodiment of the aforesaid process instead of an alcohol there may be used an aromatic hydroxy-containing compound, for example phenol.

The present invention is further illustrated by the following Examples. However, these Examples should not be construed as limiting the scope of this invention which includes equivalent variations, modifications and embodiments.

EXAMPLE 1

1 g of a perfluorosulphonic acid polymer commercially obtained from E. I. DuPont de Nemours and Company from Wilmington, Del., USA and known as Nafion (TM) 117 powder (35–60 mesh) was added to a solution of 0.5 g of aluminium triflate (trifluoromethanesulphonic acid) in 10 g of methanol and the resulting mixture stirred for 7 hours. The solid was filtered, washed with 100 ml of methanol and air dried. The resulting resin had an aluminium content of 0.53% by weight.

EXAMPLE 2

Example 1 was repeated except that the mixture was stirred for 24 hours. Analysis of the resulting resin showed an aluminium content of 0.73% by weight.

EXAMPLE 3

A Fischer-Porter tube was charged with 10.5 g of methanol, 3 g of propylene oxide and 0.2 g of the aluminium salt of the Nafion (TM) resin prepared in Example 2. The tube was purged with nitrogen to remove air, pressurised to 80 psi with nitrogen, sealed and finally heated to 80° C. with stirring. After one hour, the tube was cooled and depressurised. Analysis of the liquid product by gas chromatography showed a quantitative conversion of propylene oxide with a greater than 95% selectivity to the two isomers of methoxypropanol.

I claim:

1. A perfluorosulphonic acid polymer suitable for use as a catalyst containing units of the formula:

wherein
M is a multivalent metal cation,
R is a $C_1$ to $C_8$ fluorinated alkyl group,
z is the valency of M, and
w is an integer having a value between 1 and $z-1$.

2. A perfluorosulphonic acid polymer according to claim 1 having the general formula:

wherein
X is a perfluorosulphonic acid polymer backbone comprising fluorinated carbon atoms,
M, R, z and w are the same as in formula (I), and
y is an integer.

3. A perfluorosulphonic acid polymer according to claim 1 wherein the metal M is either aluminium, zinc, iron or chromium.

4. A perfluorosulphonic acid polymer according to claim 1 wherein the group R is a fluorinated alkyl group having from 1 to 4 carbon atoms.

5. A perfluorosulphonic acid polymer according to claim 4 wherein the group R is a $CF_3$ group.

6. A process for producing the perfluorosulphonic acid polymer of claim 1 which process comprises ion-exchanging a perfluorosulphonic acid polyer with a solution of a metal flurosulphonic acid salt.

7. A process according to claim 6 wherein the solution is an aqueous or alcoholic solution.

8. A process according to claim 6 wherein the ion-exchange is conducted for a time such that at least 10% of the available sulphonic acid groups on the polymer are exchanged.

9. A process according to claim 6 wherein the perfluorosulphonic acid polymer to be ion-exchanged has a number average molecular weight of at least 2,000.

10. A process according to claim 6 wherein the metal fluorosulphonic acid salt is the trifluoromethanesulphonic acid salt of aluminium.

* * * * *

UNITED STATES PATENT AND TRADEMARK OFFICE
CERTIFICATE OF CORRECTION

PATENT NO. : 4,687,755
DATED : August 18, 1987
INVENTOR(S) : Michael James Green It is certified that error appears in the above-identified patent and that said Letters Patent is hereby corrected as shown below:

Col. 2, line 43 the word after polymer "that" should be deleted

Claim 6, line 3 "polyer" should read -- polymer --

Signed and Sealed this

Twenty-second Day of March, 1988

Attest:

DONALD J. QUIGG

Attesting Officer

Commissioner of Patents and Trademarks